June 8, 1926.
H. C. SCOTT
1,588,197
SAFETY ATTACHMENT FOR LEVELING DEVICES
Filed July 31, 1925      2 Sheets-Sheet 2
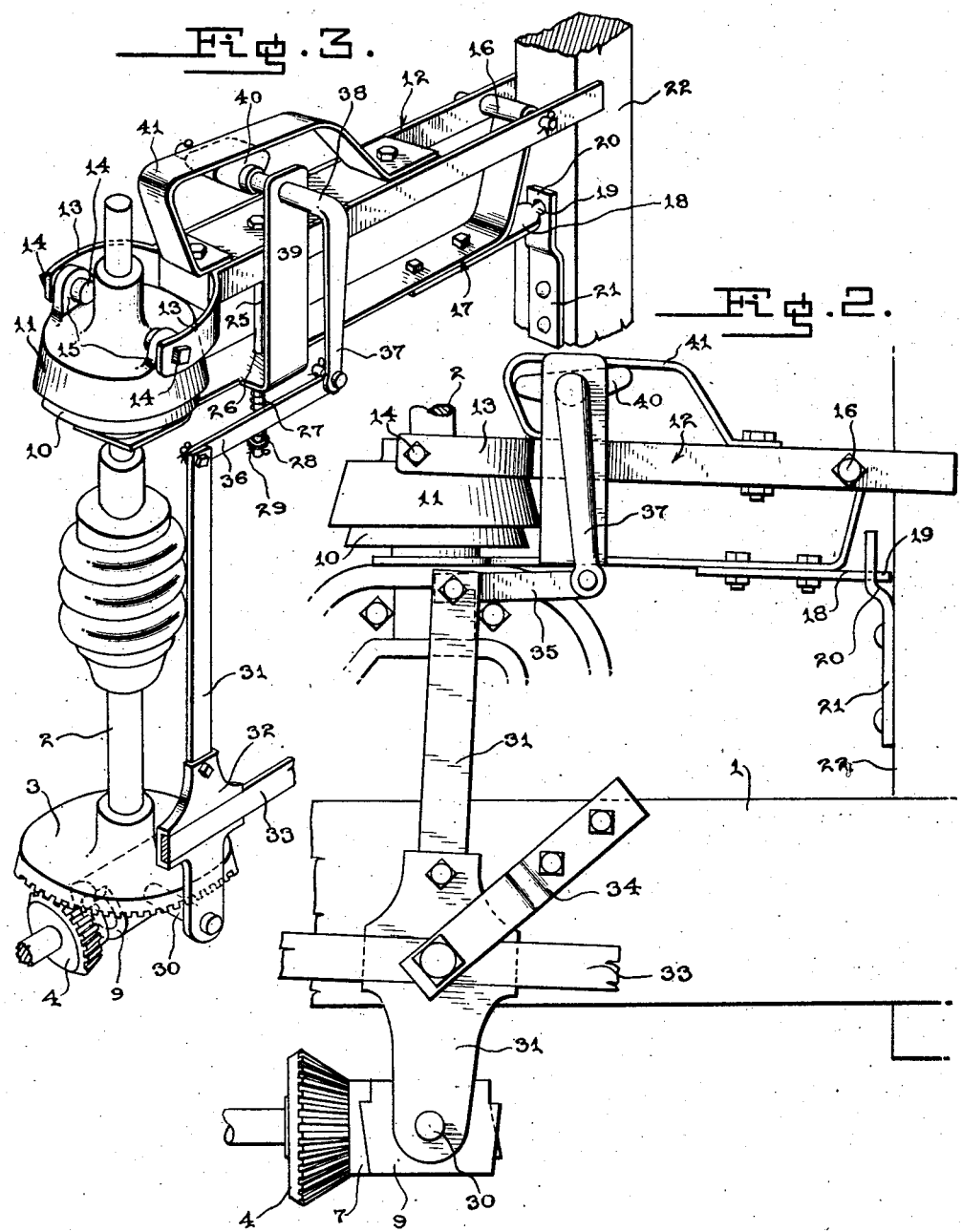
Hermon C. Scott
INVENTOR
WITNESSES
BY
ATTORNEYS Patented June 8, 1926.                                                1,588,197

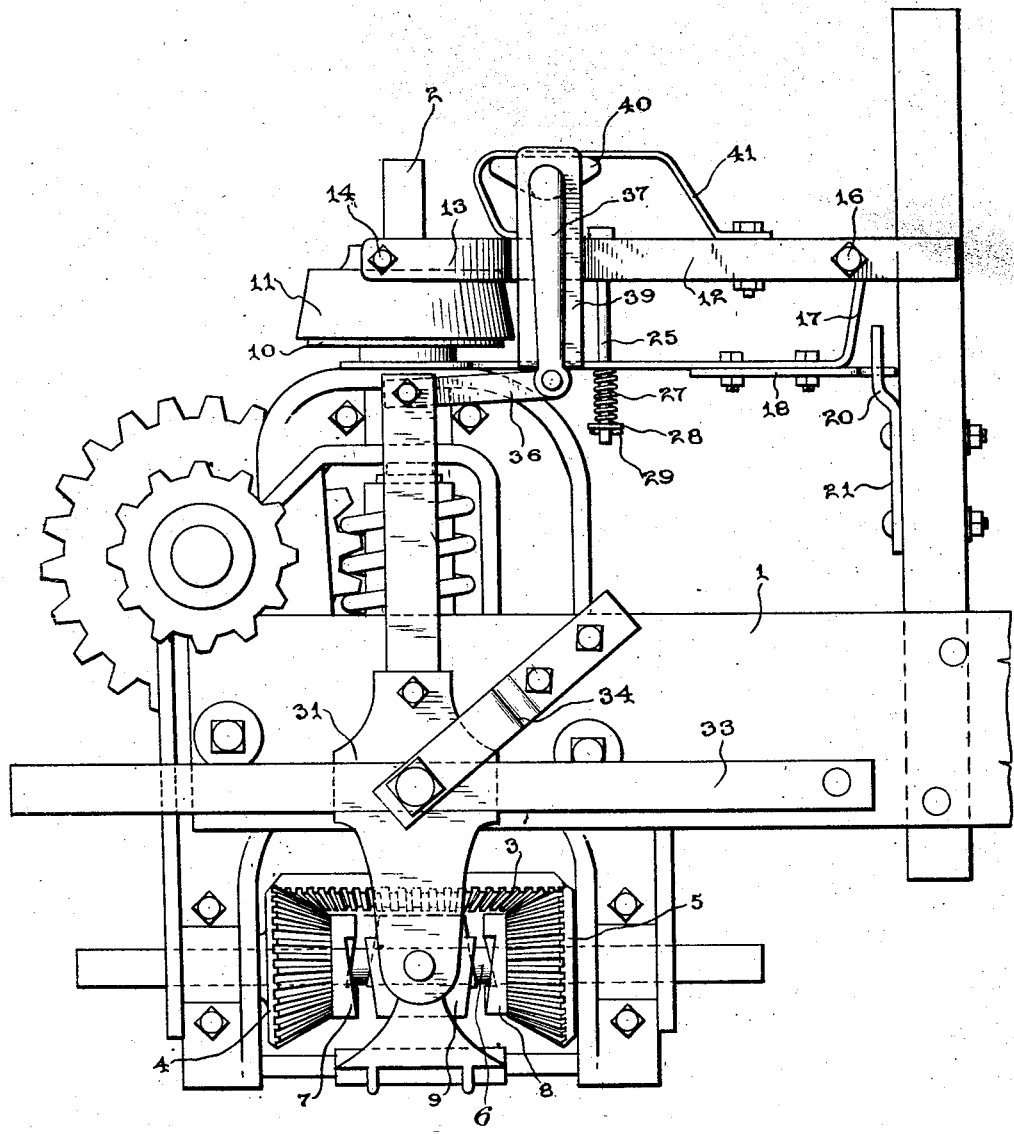

UNITED STATES PATENT OFFICE.

HERMON COLE SCOTT, OF POMEROY, WASHINGTON.

SAFETY ATTACHMENT FOR LEVELING DEVICES.

Application filed July 31, 1925.  Serial No. 47,390.

This invention relates to a braking or locking device for leveling attachments of harvesters or the like.

The object of the invention is to provide a device of this character which is operated automatically from the leveling attachment and which prevents the leveling attachment from over-running the proper or desired adjustment, while permitting unrestrained operation of the attachment under the control of the operator. The device constituting the present invention positively holds the leveling attachment in the desired adjustment.

Accordingly, the present invention, in the broader aspects, consists in the provision of a brake operatively associated with the leveling attachment (and preferably operatively connected to the worm shaft thereof) and of mechanism controlled from the clutch of the leveling attachment for setting and releasing the brake.

Other objects and advantages reside in certain novel features of the construction, arrangement and combination of parts as will be hereinafter more fully described and particularly pointed out in the appended claims, reference being had to the accompanying drawings forming part of this specification and in which:

Figure 1 is a view in elevation showing one embodiment of the invention, the brake being shown set;

Figure 2 is a fragmentary view similar to Fig. 1 but showing the brake released, and Figure 3 is a fragmentary perspective view of the brake and its operating means, only certain parts of the leveling attachment being shown.

In the drawings, the invention is shown applied to the leveling attachment which for many years past has been widely employed on "Holt" harvesters. This leveling attachment is well known and widely used and as its details form no part of the present invention it will not be described at length but only such parts will be referred to as enter into the operation of this invention.

The parts of the leveling attachment with which the present invention deals are carried on a supporting member 1 mounted on the harvester and include a worm shaft 2 on which a large beveled gear wheel 3 is fixed. The gear wheel 3 meshes with oppositely disposed beveled pinions 4 and 5 loosely mounted on a shaft 6 and having clutch members 7 and 8 with which a sliding clutch member 9 splined on the shaft 6 is selectively cooperable to effect the raising or lowering of the side of the harvester on which the attachment is mounted. All of this is the conventional arrangement.

The pressent invention in this embodiment comprises a cone shaped braking member 10 fixed to the upper end of the worm shaft 2. A shell like cone shaped brake member 11 fits over and coacts with the member 10. The clutch members have suitable facings. The member 11 is carried on a braking arm 12 having a yoke 13 connected to the member 11 by pivots 14 engaged with the arms of the yoke and with ears 15 on the member 11. The arm 12 is fulcrumed as at 16 on a bracket 17 held against upward movement but rockable slightly to permit proper engagement of the brake members, the bracket having an extension 18 pivoted as at 19 for rocking movement about its longitudinal axis on an offset portion 20 of a strap 21 secured to a post 22 fixed on the harvester. The other end of the bracket is provided with an opening through which the worm shaft extends loosely, the opening being of such a size as to permit the bracket to rock. However, this end of the bracket is engageable with the fixed clutch member 10 to assist the pivot 19 in preventing upward movement.

Yieldable means is provided for urging the brake member 11 into engagement with the brake member 10 to hold the worm shaft against movement and this means may comprise a bolt 25 fixed to the arm 12 and extending loosely down through an opening 26 provided in the bracket 17. A coil spring 27 encircles the portion of the bolt 25 projecting below the bracket. The upper end of the spring engages the underside of the bracket 17 and the lower end rests on a washer 28 placed on the top of a nut 29 threaded on the bolt, whereby the spring 27 may be tensioned.

Means is provided for automatically disengaging the members 10 and 11 when the sliding clutch member 9 is engaged with either of the clutch members 7 or 8 and this means is shown as consisting of a stud 30 rigidly connected with the sliding clutch member 9 and projecting laterally therefrom, the stud 30 being pivotally connected to the lower end of an operating bar 31 having a guide 32 slidably fitted on a rockable supporting bar 33 pivoted on a bracket 34 carried on the support 1. The upper end of the bar 31 is pivotally connected to one end of a link 36, the other end of the link being pivotally connected to a crank arm 37 formed on a cam shaft 38 rotatable in a standard 39 fixed on the bracket 17. A cam 40 is fixed on the cam shaft 38 and engages the inner side of a frame 41 fastened to the arm 12.

With this arrangement when the clutch member 9 is slid in either direction the cam shaft is rotated to release the brake against the action of the spring means. When the clutch member 9 is returned to neutral position the cam 40 is positioned to permit the spring means to again engage the brake members thereby preventing spinning or any further movement of the worm shaft so as to hold the desired adjustment of the leveling attachment.

I claim:

1. In combination with a leveling attachment, a brake organized therewith, and means controlled from the leveling attachment for operating the brake.

2. In combination with a leveling attachment having a rotatable part, a friction brake cooperable with the rotatable part, and means for controlling the brake.

3. In combination with a leveling attachment having a rotatable part and a shiftable control part, a brake cooperable with the rotatable part, spring means for setting the brake, and an automatic brake release operated by the shiftable control part.

4. In combination with a leveling attachment having a rotatable part and a shiftable control part, a brake cooperable with the rotatable part and comprising interengageable cone shaped members, a brake arm carrying one of said members, a bracket on which said arm is fulcrumed, means for mounting the bracket to permit slight rocking movement, spring means cooperable with the arm and bracket to engage the brake members, and means actuated by the shiftable control part for moving the arm to release the brake members.

5. In combination with a leveling attachment having a rotatable part and a shiftable control part, a brake cooperable with the rotatable part and comprising interengageable cone shaped members, a brake arm carrying one of said members, a bracket on which said arm is fulcrumed, spring means cooperable with the arm and bracket to engage the brake members, and means actuated by the shiftable control part for moving the arm to release the brake members.

6. In combination with a leveling attachment having a rotatable part and a shiftable control part, a brake cooperable with the rotatable part and comprising interengageable cone shaped members, a brake arm carrying one of said members, a bracket on which said arm is fulcrumed, spring means cooperable with the arm and bracket to engage the brake members, and means actuated by the shiftable control part for moving the arm to release the brake members and comprising a cam shaft, a cam thereon for lifting the arm, and motion transmission mechanism for turning the cam shaft from the shiftable control part.

7. In combination with a leveling attachment having a worm shaft, and a slidable clutch member controlling the operation of the attachment, a friction brake cooperable with the worm shaft, spring means for seting the brake, and means actuated by the sliding clutch member for releasing the brake.

8. In combination with a leveling attachment having a worm shaft, a friction brake cooperable with the shaft, spring means for setting the brake and means for releasing the brake.

9. In combination with a leveling attachment having a worm shaft and a slidable clutch member controlling the operation of the attachment, a brake member fixed on the worm shaft, a movable brake member cooperable therewith, a relatively fixed frame, a brake arm fulcrumed on the frame and carrying the movable brake member, spring means for engaging the brake members and means for releasing the brake members including a bar actuated by the slidable clutch means, a cam shaft operated from the bar, a cam on said cam shaft, and a frame carried by the arm engaged by the cam.

10. In combination with a leveling attachment having a worm shaft and a slidable clutch member controlling the operation of the attachment, a brake member fixed on the worm shaft, a movable brake member cooperable therewith, a relatively fixed frame, a brake arm fulcrumed on the frame and carrying the movable brake member, spring means for engaging the brake members and means for releasing the brake members including a bar actuated by the slidable clutch means, rockable means supporting the bar, a cam shaft having a crank arm, a link between the crank arm and bar, a cam on the cam shaft and a frame carried by the brake shaft and engaging the cam.

HERMON COLE SCOTT.